United States Patent [19]
Caffrey

[11] Patent Number: 5,857,717
[45] Date of Patent: Jan. 12, 1999

[54] PLUMBING DEVICE AND METHOD

[76] Inventor: James L. Caffrey, 1780 Moffit Gulch, Bozeman, Mont. 59715

[21] Appl. No.: 853,851

[22] Filed: May 9, 1997

[51] Int. Cl.$^6$ .................................................... F16L 13/08
[52] U.S. Cl. ...................... 285/289.1; 285/368; 285/910; 29/428
[58] Field of Search ................................... 285/368, 414, 285/148.13, 148.14, 148.15, 148.16, 148.17, 148.18, 156, 48, 49, 50, 52, 53, 54, 334.5, 148.12, 289.1, 906, 415; 29/428, 443

[56] References Cited

U.S. PATENT DOCUMENTS

| | | | |
|---|---|---|---|
| 1,292,060 | 6/1919 | Richards | 285/368 X |
| 1,592,175 | 7/1926 | Boyd | 285/48 |
| 1,929,401 | 10/1933 | Badger | 285/368 X |
| 2,131,553 | 9/1938 | Lin | 285/368 X |
| 2,437,385 | 3/1948 | Halford | 285/906 X |
| 2,460,665 | 2/1949 | Wurzburger | 285/289.1 X |
| 3,278,202 | 10/1966 | Smith | 285/50 |
| 3,501,171 | 3/1970 | Baron | 285/334.5 X |
| 4,198,078 | 4/1980 | Herbert | 285/49 |

*Primary Examiner*—Dave W. Arola
*Attorney, Agent, or Firm*—Richard C. Conover

[57] ABSTRACT

An improved device and method for plumbing a recirculating water pump into a hot water heating system, the water pump having a pair of connecting flanges on the inflow and outflow sides of the pump. The present invention includes a section of copper tubing which has one end flared, the flare preferably being at approximately right angles to the longitudinal axis of the tubing. Further, an installation flange is provided having a central hole and an inside face to be positioned against a corresponding face of a connecting flange of the recirculating water pump, the copper tubing being inserted through the central hole of the installation flange with the flared end positioned against the inside face of the installation flange. A flexible gasket, having a central opening, being positioned between the installation flange and the connecting flange of the recirculating pump. The installation flange and flexible gasket being connected to the connecting flange of the recirculating pump with bolts.

4 Claims, 2 Drawing Sheets

PRIOR ART

PLUMBING DEVICE AND METHOD

BACKGROUND OF THE INVENTION

This invention relates to an improved device and method for plumbing a recirculating water pump into a hot water heating system.

A recirculating water pump is installed in a hot water line of a home heating system to aid in forcing hot water through the heating system. A conventional recirculating water pump has connecting flanges on both the inflow side and also the outflow side. To install a recirculating water pump, a plumber conventionally uses a threaded cast iron flange to mate with each flange on the recirculating water pump so as to connect the pump into the hot water line. The following description relates to the conventional installation of one side of the recirculating water pump. The other side of the recirculating pump is plumbed similarly.

A conventional system for plumbing a hot water recirculating pump into a hot water system is shown in FIG. 1. In this figure, a conventional hot water recirculating pump A is shown having connecting flange B. An installation flange C is shown, which is conventionally constructed of cast iron. Flange C is mounted to flange B with bolts D. The installation flange C has an internal axial bore (not shown) through which water flows, which bore has internal threads (not shown) for receiving the male threads of a conventional threaded coupler E. Opposite the threaded end of coupler E is an enlarged inside diameter portion for receiving a hot water pipe F. When installing a recirculating water pump A into a hot water system F, coupler E is threaded into installation flange C. Pipe joint compound or Teflon tape is used to fill any spaces and stop leaks along the threads. Installation flange C is then bolted to recirculating pump flange B. Hot water pipe F is then soldered to coupler E in a conventional manner.

Leaks at the threaded joint between coupler E and installation flange C have been a continuous problem in the past using this method of installation. The leaks may be caused because heat from the soldering operation may melt the pipe joint compound or Teflon tape at the male end of the copper coupler, causing a leak to occur at this threaded connection. Further, the leak may be caused because the copper coupler E is of dissimilar metal than the cast iron flange C. When coupler E is soldered into the hot water pipe, the dissimilar metals expand at different rates perhaps causing these leaks to occur.

Finally, the conventional method of installing recirculating pumps is time consuming, because of the time needed to replumb the system to correct the leaks.

What is needed, is a leak-proof joint at the flange C connecting the hot water line with the recirculating pump flange A, which joint will remain leak-proof even when copper coupler E is soldered into the hot water line F.

SUMMARY OF INVENTION

The present invention relates to an improved device and method for plumbing a recirculating water pump into a hot water heating system.

A section of copper tubing is provided which has one end flared, the flare preferably being at approximately right angles to the longitudinal axis of the tubing. Further, an installation flange is provided which is preferably constructed of Neoprine. This installation flange has a central hole slightly larger than the outside diameter of the copper tubing, but smaller than the outside diameter of the flared end of the copper tubing. This flange has an inside face to be positioned against a corresponding face of a connecting flange of a conventional recirculating water pump. The copper tubing is inserted through the central hole of the flange with the flared end positioned against the inside face of the Neoprine flange. The flange also has bolt holes which are sized and spaced to correspond with threaded bolt holes of the connecting flange of the recirculating pump.

A flexible gasket, having a central opening, is positioned between the flared end of the copper tubing and the connecting flange of the recirculating pump. This gasket is provided with bolt holes corresponding to the bolt holes of the two flanges. Bolts are placed in mating holes in the flange, flexible gasket, and the connecting flange of the recirculating pump, and drawn tight by threadably securing the bolts into the threaded bolt holes of the connecting flange. When the recirculating pump is properly positioned with the flanges on both sides of the recirculating pump bolted in place, the ends of the copper tubing sections distal from the flared end may now be soldered to the hot water pipe.

Water can then flow throughout the house plumbing pipes, through the copper tubing and through the recirculating water pump. Leaks at the joint with the installation flange are prevented, because the gasket fitting between the connecting flange of the recirculating pump and the flared end of the tubing seals any leaks. Further, the leakage problems resulting from heating a threaded connection and also heating dissimilar metals is eliminated. Pipe joint compound or Teflon tape is not used; therefore, the problem of leakage caused by the melting of the pipe joint compound or Teflon tape when the copper pipes are soldered together does not occur.

BRIEF DESCRIPTION OF THE DRAWINGS

In order that the invention may be clearly understood and readily carried into effect, for example, our embodiment of the invention will now be described, by way of example only, with reference to the accompanying drawings wherein.

DESCRIPTION OF A PREFERRED EMBODIMENT

A preferred embodiment of the present invention of an improved plumbing device 10 for plumbing a conventional recirculating pump A into a hot water system F is shown in FIGS. 2 through 6.

The device 10 includes a section of copper tubing 12, which is provided with a flared end 14. The flare being constructed at approximately right angles to the longitudinal axis of tubing 12.

Figure 1:
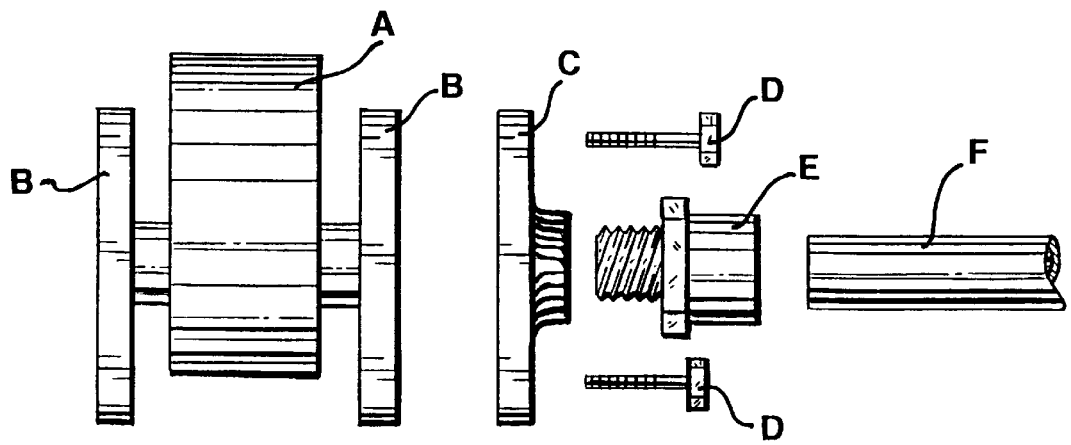
FIG. 1 is an exploded schematic view of a conventional system for plumbing recirculating water pumps into hot water lines.
Figure 2:
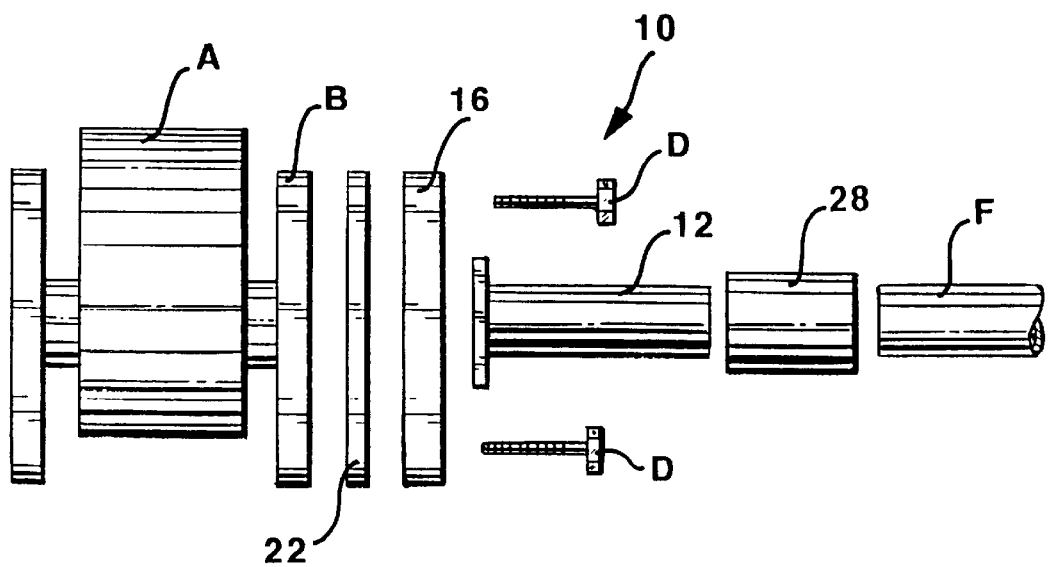
FIG. 2 is an exploded schematic view of the present invention.
Figure 4:
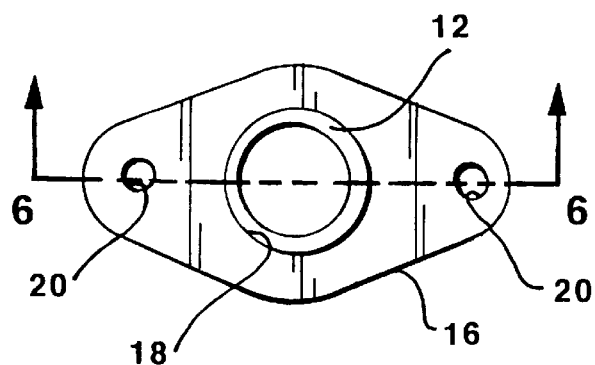
FIG. 4 is a left-hand view of the invention shown in FIG. 3.
Figure 3:
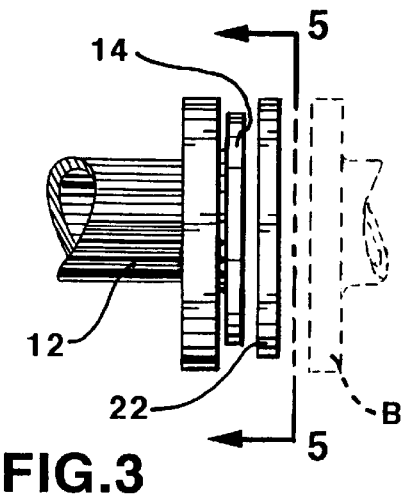
FIG. 3 is a partial elevational view of the present invention with a flared end of a copper pipe positioned in operable relation with an installation flange.
Figure 5:
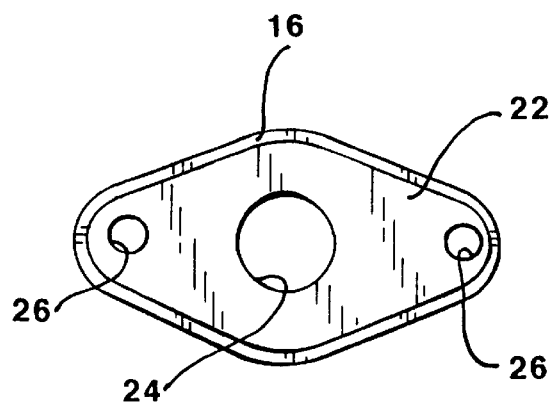
FIG. 5 is a right-hand view of the invention shown in FIG. 3 taken from along the line 5—5 in FIG. 3.
Figure 6:
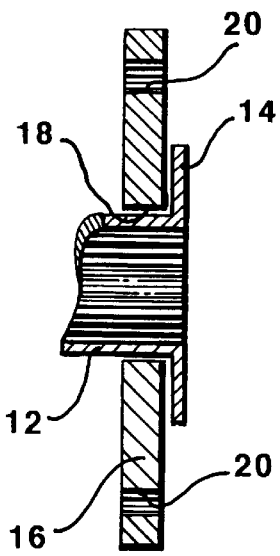
FIG. 6 is a cross-sectional view along the line 6—6 in FIG. 4.

An installation flange 16 is provided which has a central bore 18 and is used to join the section of copper tubing 12 in fluid communication with connecting flange B of recirculating pump A. (The conventional elements of FIG. 1 used in the present invention are included in FIG. 2 with corresponding letter designations.) The section of copper tubing 12 is inserted in the central bore 18 of flange 16 with the flared end 14 positioned against the inside face of flange 16, as shown in FIG. 3. Flange 16 also includes bolt holes 20 which are spaced and sized to correspond with the bolt holes of the corresponding connecting flange B of recirculating pump A. These bolt holes are used to accept bolts which are used to tighten the joint between flange 16 and flange B of recirculating pump A. In a preferred embodiment, flange 16 is constructed of Neoprine material. Neoprine eliminates a problem caused by electrolysis between dissimilar materials.

Further, a flexible gasket 22 is provided which has a central hole 24 and bolt holes 26 corresponding to the bolt holes of flange 16 and flange B of recirculating pump A. These bolt holes are sized to accept bolts D passing through the bolt holes 20 of flange 16 and accepted by the bolt holes of flange B of recirculating pump A. The central hole 24 of gasket 22 is sized to be approximately the same size as the inside diameter of copper tubing 12, but less than the outside diameter of flared end 14. A conventional pipe connector 28 is used to connect pipe 12 with hot water system F as by soldering.

In using this invention, a plumber obtains a section of copper tubing 12 with a flare 14 at one end. The copper tubing 12 is then inserted in bore 18 of flange 16 and the flared end 14 drawn against the inside face of flange 16. Gasket 22 is placed between the flared end 14 of tubing 12 and flange B on the recirculating pump A and bolt D screwed into flange B through bolt hole 20 in flange 16 and holes 24 in gasket 22. The bolt holes in flange B are threaded; therefore, as bolts D are tightened, gasket 32 is compressed between flanges 16 and B thus making a leak-proof joint between flange 16 and flange B.

Copper tubing F may then be joined to copper tubing 12 with a coupler 28 as by soldering. Soldering heat will not cause this joint to leak, because no pipe joint compound or Teflon tape is used and copper is not being threadably inserted into a cast iron flange. The gasket 22 seals the spaces between flange B of the recirculating pump A and the flared end 14 of tubing 12.

While the fundamental novel features of the invention have been shown and described, it should be understood that various substitutions, modifications, and variations may be made by those skilled in the art without departing from the spirit or scope of the invention. Accordingly, all such modifications or variations are included in the scope of the invention as defined by the following claims.

I claim:

1. A device for plumbing a hot-water recirculating pump into a hot water line, the pump having a connecting flange with a pair of spaced apart holes for receiving connecting bolts comprising:

a section of copper tubing having a flare at one end, the flare comprising an annular disk positioned at a substantially right angle to a longitudinal axis of the section of copper tubing;

an installation flange having an inside face for mating with the connecting flange of the hot-water recirculating pump and having a peripheral shape corresponding with the shape of the connecting flange;

the installation flange further having a central hole for receiving the section of copper tubing with the flared end positioned against the inside face of the flange, and further including a pair of spaced apart holes corresponding with the pair of holes located in the connecting flange;

a gasket positioned between the installation flange and the connecting flange, the gasket having a central hole to provide fluid communication from the copper tubing to the recirculating pump, the gasket further being shaped to have a peripheral shape corresponding with the shape of the connecting flange and further including a pair of spaced apart holes corresponding with the pair of holes located in the connecting flange;

a pair of bolts inserted through the holes provided in the corresponding holes of the connecting flange, gasket and installation flange, and a pair of nuts threaded on the bolts for clamping the connecting flange and installation flange together, sandwiching the gasket in between; and means for connecting the section of copper tubing in fluid communication with the hot water line.

2. The device according to claim 1 wherein the installation flange is constructed of Neoprine.

3. A method of plumbing a hot-water recirculating pump into a hot water line, the pump having a connecting flange with a pair of spaced apart holes for receiving connecting bolts comprising:

providing a section of copper tubing having a flare at one end, the flair comprising an annular disk positioned at a substantially right angle to a longitudinal axis of the section of copper tubing;

providing an installation flange having an inside face for mating with the connecting flange, the installation flange having a central hole for receiving the section of copper tubing and further having a peripheral shape corresponding with the shape of the connecting flange and further having a pair of spaced apart holes corresponding with the pair of holes located in the connecting flange;

inserting the section of copper tubing through the central hole of the installation flange, and positioning the flared end against the inside face of the installation flange;

positioning a gasket between the installation flange and the connecting flange, the gasket having a central hole positioned to provide fluid communication from the copper tubing to the recirculating pump, the gasket further being shaped to have a peripheral shape corresponding with the shape of the connecting flange and further including a pair of spaced apart holes corresponding with the pair of holes located in the connecting flange;

inserting a pair of bolts in the holes provided in the corresponding holes of the connecting flange, gasket and installation flange;

threading onto each of the ends of the bolts a nut for clamping the connecting flange and installation flange together sandwiching the gasket in between;

connecting the section of copper tubing in fluid communication with the hot water line.

4. The method according to claim 3 wherein the installation flange is constructed of Neoprine.

* * * * *